July 26, 1966  C. E. MONK  3,262,414
MEANS TO ATTACH WARNING DEVICE TO VEHICLE
Filed March 8, 1965
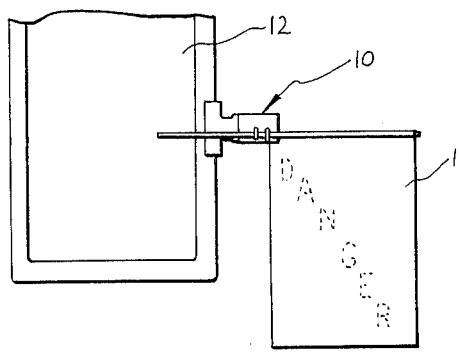
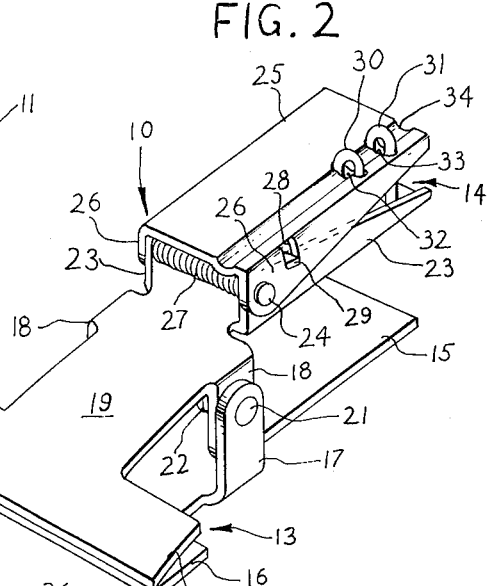
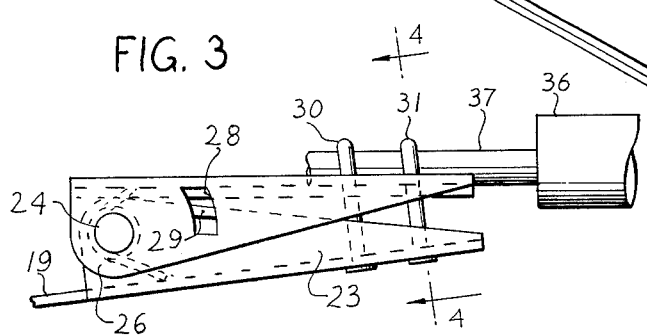
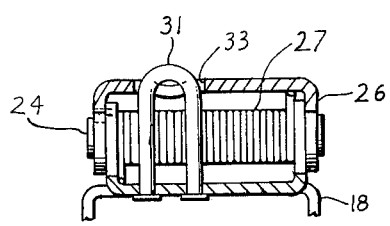
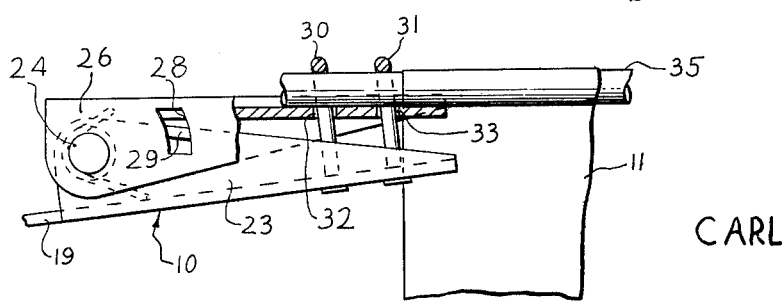
INVENTOR.
CARL E. MONK United States Patent Office 3,262,414
Patented July 26, 1966

3,262,414
MEANS TO ATTACH WARNING DEVICE
TO VEHICLE
Carl E. Monk, 428 Southland Blvd.,
Louisville, Ky. 40214
Filed Mar. 8, 1965, Ser. No. 437,647
3 Claims. (Cl. 116—28)

This invention relates to an improved means to removably attach a warning device such as a flag or a flare to a vehicle.

It is common practice for the operators of commercial vehicles such as, for example, trucks, buses and trailer-trucks to carry with them in their vehicles warning devices for use in the event the vehicle becomes disabled and it is necessary to park the vehicle at the side of the road. Appropriate warning devices include flares and flags. The most common type of flare carried by vehicle operators is the "fusee" type which comprises a cylindrical body portion, containing a composition which will blaze when ignited, and a nail-like element protruding from one end of the cylindrical portion. The fusee was designed many years ago when trucks and trailers were equipped with wooden tail gates and the nail-like element could easily be driven into the wooden tail gates. Nowadays, however, trucks and trailers—and of course buses—do not have wooden tail gates and it is therefore virtually impossible to secure a fusee to the vehicle itself. Similarly, it is often difficult to conveniently secure a conventional warning flag to a vehicle inasmuch as there is often no means on the vehicle to receive the flag staff. An additional problem that may be encountered with the use of a warning flag is the separation of the flag from the staff due to ambient breezes or breezes caused by passing vehicles. Many flags are provided only with a sleeve at one end which slips over the staff with no means provided to secure the flag or sleeve from slipping off the staff. Accordingly, it would be desirable to provide a device to removably attach a flag, flare or similar warning means to a vehicle.

It is an object of this invention to provide an improved means to removably attach a warning device to a vehicle.

It is another object of this invention to provide a means to removably attach a fusee-type flare to a vehicle having no appropriately located wooden elements into which the nail-like element of the fusee may be driven.

It is also an object of this invention to provide a means which will removably attach a warning flag to a vehicle and which minimizes the possibility of a breeze dislodging the flag from the vehicle.

It is another object of this invention to provide a single means of the type described which will removably secure to a vehicle a warning flag or a flare with equal effectiveness.

Briefly stated, in accordance with one aspect of the invention, a device is provided to secure warning means to a vehicle and comprises a first clamping means adapted to removably clamp and secure itself to the vehicle and a second clamping means carried by the first clamping means and being adapted to removably secure and support a warning means. With this arrangement, the device may be conveniently carried within the vehicle and may be secured to any of several positions on the exterior of the vehicle when needed. Also, because the device may be removably secured to the warning means, it may be used with a wide variety of warning means, and may be constructed to last well beyond the normal life span of any individual warning means.

While the specification concludes with claims particularly pointing out and distinctly claiming the subject matter which is regarded as the invention, it is believed the invention will be better understood from the following description taken in connection with the accompanying drawings, in which:

FIGURE 1 is an elevational view showing the present invention secured to a portion of a vehicle and in turn supporting a warning means;

FIGURE 2 is a perspective view showing the preferred form of the present invention;

FIGURE 3 is a partial elevation view of the present invention showing it supporting a flare;

FIGURE 4 is a sectional view taken along line 4—4 of FIGURE 3; and

FIGURE 5 is a view similar to FIGURE 3 showing the present invention supporting a warning flag with the invention partially cut away to show details.

Referring now to the drawings, there is illustrated a device 10 to secure warning means such as flag 11 to a vehicle. One obvious, and readily accessible, element of a vehicle to which the device 10 may be secured is a rear mud flap 12. Device 10 very generally comprises two main elements; a first, or large clamping means 13, which is adapted to clamp itself to the vehicle, and a second, or smaller clamping means 14, which is carried by the large clamping means 13 and which is adapted to clamp and support a warning device.

Clamping means 13 includes a first arm 15 which may broaden out at one end to form an enlarged clamping surface 16. Integral with opposite edges of arm 15 are a pair of brackets 17, only one of which can be seen in FIGURE 2. Pivotally attached to brackets 17 are a complementary pair of brackets 18 which extend from a second arm 19. Second arm 19 may also be broadened at one end to provide an enlarged clamping surface 20 which cooperates with the aforementioned clamping surface 16 to comprise a clamping means. A pin 21 extends through the pairs of brackets 17 and 18 to pivotally secure brackets 17 to brackets 18. A biasing means 22, preferably having the form of a conventional coil spring, is provided to normally bias clamping surfaces 16 and 20 together as shown in FIGURE 2.

The end of arm 19 opposite clamping surface 20 has a bent-up flange 23 at each side thereof and an opening is provided in each flange 23. A pin 24 extends through each of the openings and pivotally secures a movable member 25 to arm 19. Movable member 25 has a pair of flanges 26, each of which has an opening therethrough to cooperate with pin 24. Biasing means 27 are provided to normally bias the distal end of member 25 away from the adjacent end of arm 19. An additional opening 28 is provided in at least one of the flanges 26 and cooperates with a tab 29 on flange 23 to limit the movement of member 25, as caused by biasing means 27, to the position illustrated in FIGURE 2.

A pair of U-shaped elements 30 and 31 have their ends suitably secured to arm 19 and extend through a pair of slots 32 and 33 respectively. A trough-like depression 34 extends along member 25 and is intersected by each of the slots 32 and 33.

It should be noted that U-shaped elements 30 and 31 and slots 32 and 33 are positioned closer to one edge of member 25. This is purposely done in the preferred form of the present invention to allow an increased surface area on movable member 25 so that member 25 may be conveniently manually pivoted about pin 24. It should also be noted that U-shaped element 31, the element closest to the distal end of member 25, is spaced a substantial distance from the distal end of member 25. The reason for this will become evident from a study of FIGURE 5 wherein flag 11 is shown supported by device 10. As mentioned earlier, flag 11 is provided with a sleeve at one end which slips over a flag staff 35 and, quite often, no means are provided to secure the flag or sleeve against slipping from the staff. By spacing element 31 from the distal end of member 25, a portion of flag 11 may be wedged between staff 35 and member 25 to thereby secure flag 11 from slipping off staff 35.

The operation of the above-described device should be obvious at this point; however, to avoid any possible confusion, an explanation is presented. By manually grasping device 10 and squeezing the ends of arms 15 and 19 together, a portion of the vehicle such as, for example, mud flap 12, may be positioned between clamping surfaces 16 and 20. Upon release of arms 15 and 19, device 10 will secure itself to the mud flap. Subsequently, member 25 may be manually pivoted about pin 24 toward arm 19 thereby spacing the bight portions of U-shaped elements 30 and 31 a sufficient distance from depression 34 so that a flag staff or the nail-like element of a flare may be conveniently inserted therebetween. By then releasing movable member 25, biasing means 27 will exert a clamping force on the nail-like element or flag staff thereby securing the flare or flag to the device 10. A flare 36 with its nail-like element 37 is shown in FIGURE 3 secured to the device 10.

Although the description thus far has been directed toward the use of the present invention as it applies to a vehicle adapted to travel on the public highways, it should be apparent that the invention is also useful for rail vehicles as well. For example, clamping means 13 may be secured to the metal ladder conventionally provided on the side of a box car, or other rail vehicle, in a manner similar to that illustrated in FIGURE 1. Therefore, the present invention should not be assumed as limited in usefulness to a vehicle adapted to travel on the public highway.

Thus it can be seen that the present invention provides a device capable of removably securing to a vehicle a warning flag or a flare with equal effectiveness.

As will be evident from the foregoing description, certain aspects of the invention are not limited to the particular details of construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. A device to secure warning means to a vehicle comprising:
    (a) first clamping means adapted to removably clamp to the vehicle,
    (b) second clamping means secured to said first clamping means and adapted to removably secure and support a warning means,
    (c) said second clamping means including a spring-biased pivotal plate having at least one slot therein, and
    (d) a relatively stationary U-shaped element extending through said slot and adapted to receive and secure a warning means between the bight portion of said element and said pivotal plate.

2. A device to secure warning means to a vehicle comprising:
    (a) first clamping means adapted to removably clamp to the vehicle,
    (b) second clamping means secured to said first clamping means and adapted to removably secure and support a warning means,
    (c) said second clamping means including a spring-biased pivotal plate having at least one slot therein, and
    (d) a relatively stationary U-shaped element extending through said slot and adapted to receive and secure a warning means between the bight portion of said element and said pivotal plate,
    (e) said plate having a trough-like recessed portion on each side of said slot.

3. A device to secure a flag having a flag staff to a vehicle comprising:
    (a) first clamping means adapted to removably clamp to the vehicle,
    (b) second clamping means secured to said first clamping means and adapted to removably secure and support a warning means,
    (c) said second clamping means including a spring-biased pivotal plate having at least one slot therein, and
    (d) a relatively stationary U-shaped element extending through said slot and adapted to receive and secure a warning means between the bight portion of said element and said pivotal plate,
    (e) said plate extending beyond said U-shaped element whereby the flag is wedged between said plate and the flag staff to prevent the flag from slipping off the staff.

References Cited by the Examiner

UNITED STATES PATENTS

| | | | |
|---|---|---|---|
| 1,117,277 | 11/1914 | Supplee | 24—81 |
| 1,659,312 | 2/1928 | Colwell | 339—262 |
| 2,145,165 | 1/1939 | Douglas | 339—262 |
| 2,171,665 | 9/1939 | Meltzer | 24—81 |
| 2,527,357 | 10/1950 | Donahey | 116—173 |
| 2,764,122 | 9/1956 | Irvin | 116—173 |

LOUIS J. CAPOZI, *Primary Examiner.*